(12) United States Patent
Kauffman et al.

(10) Patent No.: US 6,842,746 B1
(45) Date of Patent: Jan. 11, 2005

(54) METHOD AND SYSTEM FOR OPERATIONS MANAGEMENT

(75) Inventors: Stuart A. Kauffman, Santa Fe, NM (US); James Herriot, Palo Alto, CA (US)

(73) Assignee: NuTech Solutions, Inc., Charlotte, NC (US)

( * ) Notice: Subject to any disclaimer, the term of this patent is extended or adjusted under 35 U.S.C. 154(b) by 0 days.

(21) Appl. No.: 09/507,966

(22) Filed: Feb. 22, 2000

Related U.S. Application Data (63) Continuation-in-part of application No. 09/345,441, filed on Jul. 1, 1999, and a continuation-in-part of application No. 09/080,040, filed on May 15, 1998.
(60) Provisional application No. 60/120,120, filed on Feb. 19, 1999.

(51) Int. Cl.[7] .................................................. G06N 5/00
(52) U.S. Cl. ...................... 706/45; 370/259; 455/452.2; 707/104
(58) Field of Search .......................... 706/45; 370/259; 455/451, 452

(56) References Cited

U.S. PATENT DOCUMENTS

| | | | | |
|---|---|---|---|---|
| 5,513,379 A | * | 4/1996 | Benveniste et al. | 455/451 |
| 5,809,423 A | * | 9/1998 | Benveniste | 455/452.2 |
| 5,812,533 A | * | 9/1998 | Cox et al. | 370/259 |
| 6,128,624 A | * | 10/2000 | Papierniak et al. | 707/104.1 |

OTHER PUBLICATIONS

Mi, Peiwei et al, A Meta–Model for Formulating Knowledge–Based Models of Software Development, Decision Support Systems, 17(3), 313–330, 1996.*

* cited by examiner

Primary Examiner—Wilbert L. Starks, Jr.
(74) Attorney, Agent, or Firm—Alston & Bird LLP (57) ABSTRACT

The present invention relates generally to a method and system for performing operations management in an environment of resources. More particularly, the present invention performs operations management by representing the resources with integrated circuits that find relations among the resources and combine related resources to form new resources.

34 Claims, 8 Drawing Sheets

METHOD AND SYSTEM FOR OPERATIONS MANAGEMENT

RELATED APPLICATIONS

This application claims priority from Provisional Application 60/120,120 filed on Feb. 19, 1999. This application is a continuation-in-part of U.S. patent application Ser. No. 09/080,040 filed May 15, 1998 and is a continuation-in-part of U.S. application Ser. No. 09/345,441 filed Jul. 1, 1999.

FIELD OF THE INVENTION

The present invention relates generally to a method and system for performing operations management in an environment of resources. More particularly, the present invention performs operations management by representing the resources with devices that find relations among the resources and combine related resources to form new resources.

BACKGROUND

An environment includes entities and resources as well as the relations among them. An exemplary environment includes an economy. An economy includes economic agents, goods, and services as well as the relations among them. Economic agents such as firms can produce goods and services in an economy. Operations management includes all aspects of the production of goods and services including supply chain management, job shop scheduling, flow shop management, the design of organization structure, etc.

Firms produce complex goods and services using a chain of activities which can generically be called a process. The activities within the process may be internal to a single firm or span many firms. A firm's supply chain management system strategically controls the supply of materials required by the processes from the supply of renewable resources through manufacture, assembly, and finally to the end customers. See generally, Operations Management, Slack et al., Pitman Publishing, London, 1995. ("Operations Management").

Other types of entities similarly perform service using processes. As a non-limiting example, military organizations perform logistics within a changing environment to achieve goals such as establishing a beachhead or taking control of a hill in a battlefield.

The activities of the process may be internal to a single firm or span many firms. For those activities which span many firms, the firm's supply chain management system must perform a variety of tasks to control the supply of materials required by the activities within the process. For example, the supply chain management system must negotiate prices, set delivery dates, specify the required quantity of the materials, specify the required quality of the material, etc.

Similarly, the activities of the process may be within one site of a firm or span many sites within a firm. For those activities which span many sites, the firm's supply chain management system must determine the number of sites, the location of the sites with respect to the spacial distribution of customers, and the assignment of activities to sites. This allocation problem is a generalization of the quadratic assignment problem ("QAP").

For the activities of the process within a site of a firm, the firm's job shop scheduling system assigns activities to machines. Specifically, in the job shop scheduling problem ("JSP"), each machine at the firm performs a set of jobs, each consisting of a certain ordered sequence of transformations from a defined set of transformations, so that there is at most one job running at any instance of time on any machine. The firm's job shop scheduling system attempts to minimize the total completion time called the makespan.

Manufacturing Resource Planning ("MRP") software systems track the number of parts in a database, monitor inventory levels, and automatically notify the firm when inventory levels run low. MRP software systems also forecast consumer demand. MRP software systems perform production floor scheduling in order to meet the forecasted consumer demand.

Previous research for supply chain management has studied the effects of demand on the production rate at earlier or upstream operations along the supply chain. Additional research has classified the different relationships which exist in supply chains. This research has classified supply chain relationships as: integrated hierarchy, semi-hierarchy, co-contracting, coordinated contracting, coordinated revenue links, long term trading commitments and short term trading commitments. See Operations Management, Chapter 14.

Previous research for MRP has produced algorithms to compute material volume requirements and to compute timing requirements for those materials using Gantt charts. Other MRP algorithms such as the Optimized Production (OPT) schedule production systems to the pace dictated by the most heavily loaded resources which are identified as bottlenecks. See Operations Management, Chapter 14.

However, previous research on operations management has not adequately accounted for the effect of failures or changes in the economic environment on the operation of the firm. For example, machines and sites could fail or supplies of material could be delayed or interrupted. Accordingly, the firm's supply chain management, job shop scheduling and organization structure must be robust and reliable to account for the effect of failures on the operation of the firm.

Similarly, the economic environment changes with the introduction of new goods and services, new production technologies, new legislation and the extinction of older goods and services. Similarly, changes in the supply and demand for materials also affect the economic environment. For example, the contingent value to buyer and seller of goods or services, the cost of producing the next kilowatt of power for a power generating plant, and the value of the next kilowatt of power to a purchaser affect the economic environment. Accordingly, the firm's supply chain management, job shop scheduling and organization structure must be flexible and adaptive to account for the effect of changes to the firm's economic environment.

The utility of existing supply chain management systems is also limited. For example, large organizations including military organizations frequently have thousands of spare parts and vast catalogs describing their function and purpose. But the management of these parts is often clumsy and inefficient.

Accordingly, these exists a need for an operations management system and method that represents operations and/or parts with devices wherein these devices search for related operations and/or parts and perform transformations on these related operations and/or parts to create new operations and/or parts. In other words, there exists a need for a system and method for operations management where parts and/or operations are represented by devices that determine how they interact with one another.

SUMMARY OF THE INVENTION

The present invention present a method and system for operations management that represents operations and/or parts with devices wherein these devices search for related operations and/or parts and perform transformations with these related operations and/or parts to form new operations and/or parts.

The present invention includes a system for performing operations management in an environment of a plurality of resources comprising:

a plurality of devices corresponding to the plurality of resources, each of said devices performing the steps of:
characterizing said corresponding resource; and
determining at least one relation between said corresponding resource and others of said plurality of resources.

The present invention includes a system form performing operations management wherein said each device performs the further steps of:

selecting at least one of said resources having said at least one relation; and transforming said selected resources to form at least one new resource in the environment.

The present invention includes a system for performing operations management wherein each of said plurality of devices is physically attached to said corresponding resource.

DETAILED DESCRIPTION OF THE PREFERRED EMBODIMENT

Figure 1:
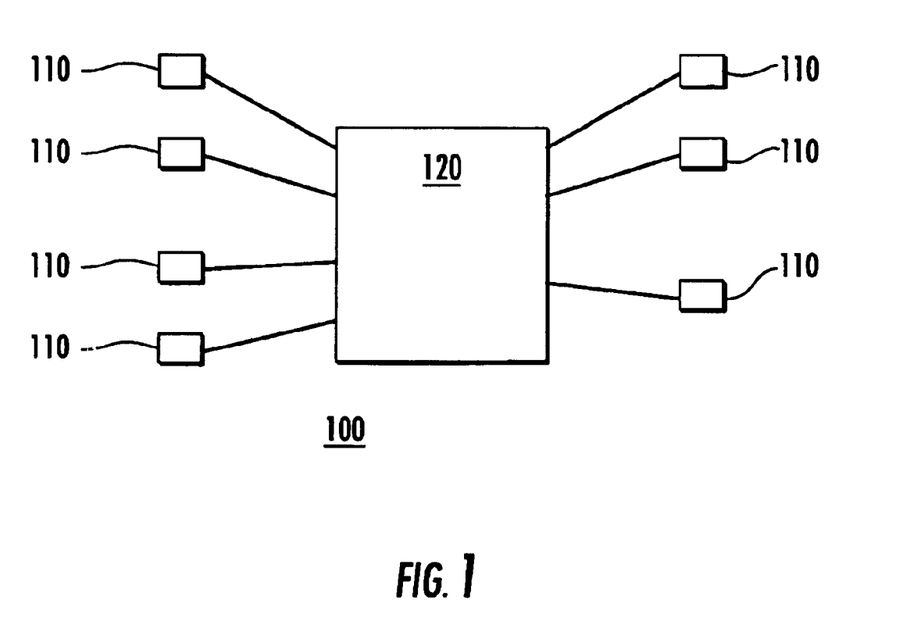
FIG. 1 provides a diagram showing the components of the system and method for operations management of the present invention.

FIG. 1 provides a diagram showing the components of the system and method for operations management of the present invention 100. These components include devices 110 representing resources. Resources include parts, operations, intermediate parts and/or operations that are formed from more primitive parts and/or operations, etc. The components further include a communication medium 120 to facilitate communication among the devices 110.

Without limitation, the following embodiments of the invention are described in the illustrative context of a solution using object oriented design and graph theory. However, it will be apparent to persons of ordinary skill in the art that other design techniques such as a structured procedural paradigm or an agent-based design could be used to embody the aspects of the present invention which include the determination of relations among resources, the synthesis of a graph representation of the relations, the analysis of the graph representation and the transformation of resources having relations to generate new resources. Agent-based design is described in, Go to the ant: *Engineering Principles from Natural Multi-Agent Systems*, H. Van Dyke Parunak, Annals of Operations research 75(1997) 69–101, the contents of which are herein incorporated by reference.

In the preferred embodiment, each device 110 representing a resource determines relations with other resources. Each device 110 constructs an undirected graph representation G[V, E, δ] of the relations between its corresponding resource and other resources. As is known in the art, an undirected graph G[v, E, δ] consists of a set V of vertices, a set E of edges, and a function 6 from the set E to the set of ordered pairs <u, v> for u a member of V and v a member of V. See Introduction to Discrete Structures, Preparata and Yeh, Addison-Wesley Publishing Company, Inc., (1973), pg 67.

In one of the plurality of undirected graphs, G[V, E, δ], each vertex v of the set of vertices V represents an object. More formally, there exists a one-to-one correspondence between the set of objects representing the resources in the environment and the set of vertices V in the undirected graph G[V, E, δ]. A function denoted by g: O–>V from the set of objects O representing the resources in the environment to the set of vertices V in the corresponding undirected graph G[V, E, δ] assigns the vertex v to an object o (g(o)=v). Preferably, a vertex v is created and assigned to an object o when the resource corresponding to the object becomes conceivable in the environment.

As is known to persons of ordinary skill in the art, objects are distinguishable entities and have attributes and behavior. See Object Oriented Modeling and Design, Rumbaugh, J., Prentice hall, Inc. (1991), Chapter 1. Exemplary attributes and behavior for the objects of the present invention include, "needs a", "is a", "performs a", "has a", etc. These attributes and behavior enable the invention to find complement and substitute parts and/or operations.

In one embodiment, the device 110 is physically attached to a resource to establish the correspondence between them. In another embodiment, the device 110 contains data identifying a resource to establish the correspondence between them. In one embodiment, the data is a bar code. In the exemplary context of a manufacturing plant, the devices 110 tag machines and parts and discover how these resources interact with one another form manufactured products.

Figure 2:
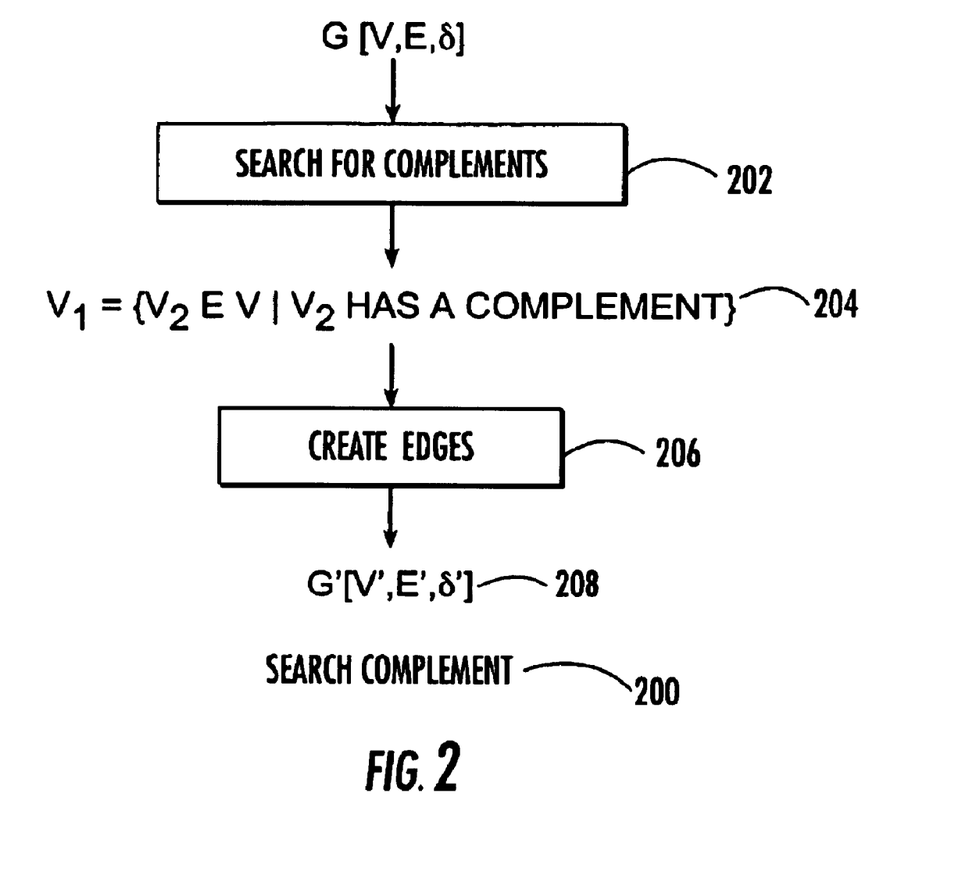
FIG. 2 provides a dataflow diagram of a SearchComplement method executing on the devices 110 representing resources in an environment.

FIG. 2 provides a dataflow diagram of a SearchComplement method executing on the devices 110 representing resources in an environment. As is known to persons of ordinary skill in the art, a dataflow diagram is a graph whose nodes are processes and whose arcs are dataflows. See *Object Oriented Modeling and Design*, Rumbaugh, J., Prentice Hall, Inc. (1991), Chapter 1. In step 202, the Search-Complement method 200 searches for other objects represented by vertices from the set of vertices V in the undirected graph G[V, E, δ] having the attributes or operations which complement the searching object's (v1) selected attributes or operations. Complements are sets of resources which are used jointly to produce other resources. For example, the screw and the screw driver are complementary parts. The SearchComplement method 200 searches for an object (v2) having complementary attributes or complementary operations by traversing the generalization or inheritance hierarchy from the class corresponding to the object (v2). In the preferred embodiment, the SearchComplement method 200 searches continuously for complement objects. However, as is known in the art, the SearchComplement method 200 can search by executing a discrete number of times. Execution of step 202 yields at 204 a subset V1 of the set of vertices V: V1={v2 member of V|v2 has a complementary attribute or operation of v1}.

In step 206, for each object (v2) matching the search criteria, the SearchComplement method 200 creates an edge connecting the vertices v1, v2 (<v1,v2>) which becomes a member of the set of edges E in the undirected graph G[V, E, δ]. The SearchComplement method 200 also creates a complement edge label for each edge (<v1,v2>) created in step 206 to properly identify the relation between the vertices v1, v2. Execution of step 206 yields at 208 a modified undirected graph G[V, E, δ].

Accordingly, execution of the SearchComplement method 200 at all devices 110 representing resources yields an undirected graph G[V, E, δ] representation for each resource in the environment. Moreover, the SearchComplement method 200 yields undirected graph G[V, E, δ] representations which evolve as new resources enter the environment and existing resources services expire from the environment. Further, the SearchComplement method 200 can continue to develop the undirected graph G[V, E, δ] representations after the environment stops changing.

Figure 3:
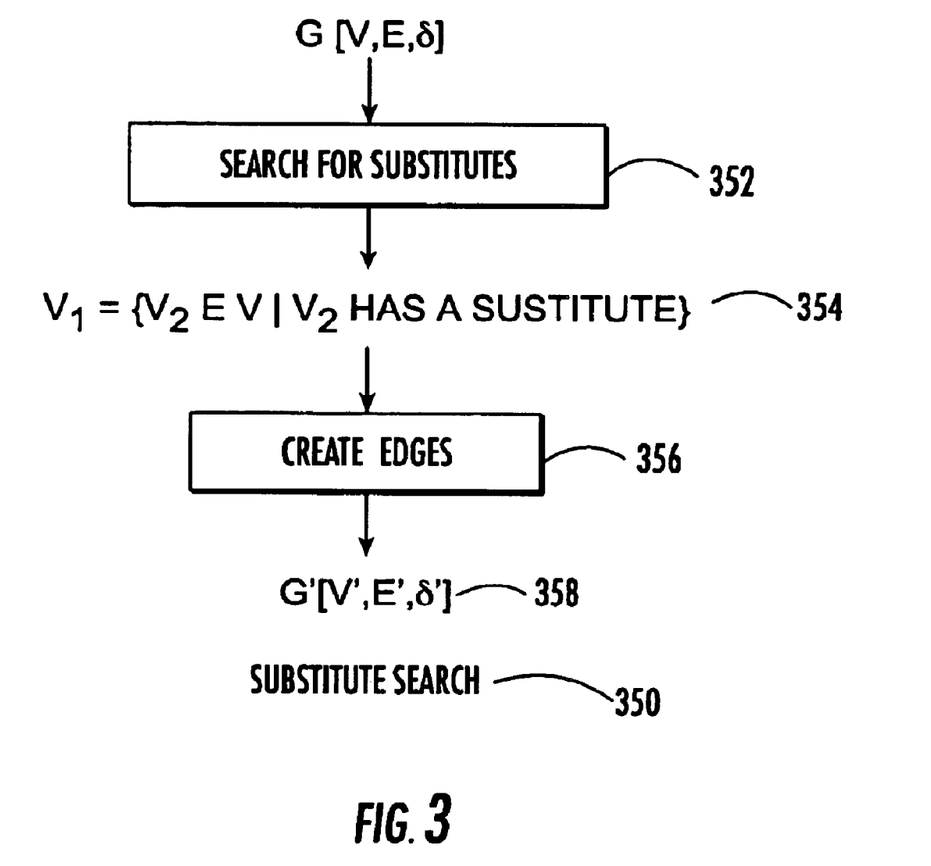
FIG. 3 provides a dataflow diagram of a SearchSubstitute method executing on the devices 110 representing resources in an environment.

FIG. 3 provides a dataflow diagram of a SearchSubstitute method executing on the devices 110 representing resources in an environment. In step 352, the SearchSubstitute method 350 searches for other objects represented by vertices from the set of vertices V in the undirected graph G[V, E, δ] having the attributes or operations which can substitute for the searching object's (v1) selected attributes or operations. Substitutes are sets of resources which might substitute: for one another in a given production technology or consumption resource. For example, the screw and nail are substitute parts. The SearchSubstitute method 350 searches for an object (v2) having substitute attributes or substitute operations by traversing the generalization or inheritance hierarchy from the class corresponding to the object (v2). In the preferred embodiment, the SearchSubstitute method 350 searches continuously for substitute objects. However, the SearchSubstitute method 350 can search by executing a discrete number of times. Execution of step 352 yields at 354 a subset V1 of the set of vertices V: V1=(v2 member of V|v2 has a substitute attribute or operation of v1).

In step 356, for each object (v2) matching the search criteria, the SearchSubstitute method 350 creates an edge connecting the vertices v1, v2 (<v1,v2>) which becomes a member of the set of edges E in the undirected graph G[V, E, δ]. The SearchSubstitute method 350 also creates a substitute edge label for each edge (<v1,v2>) created in step 356 to properly identify the relation between the vertices v1, v2. Execution of step 356 yields at 358 a modified undirected graph G[V, E, δ].

Accordingly, execution of the SearchSubstitute method 350 for all objects representing the goods and services in the economy yields an evolving undirected graph G[V, E, δ] representation at each resource in the environment. Moreover, the SearchSubstitute method 350 yields undirected graph G[V, E, δ] representations which evolve as new resources enter the environment and existing resources expire from the environment. Further, the SearchSubstitute operation 350 can continue to develop the undirected graph G[V, E, δ] representations after the environment stops changing.

Figure 4A:
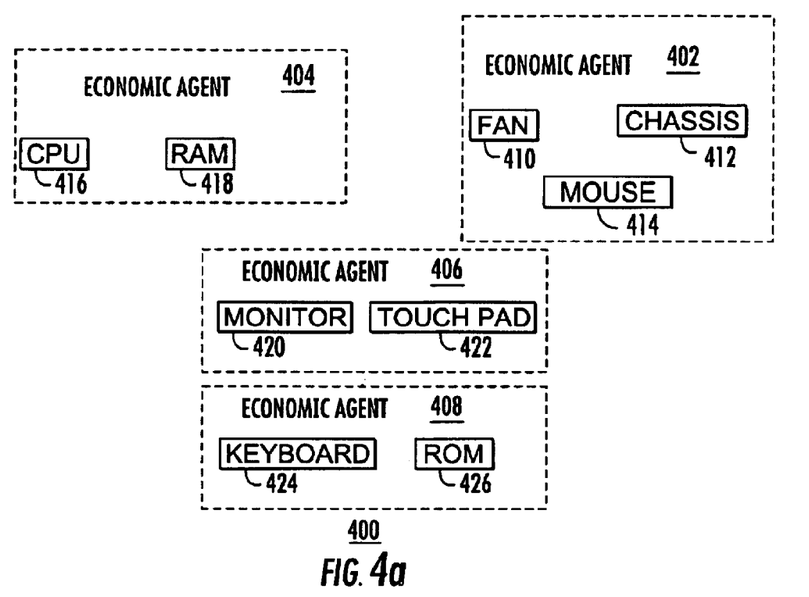
FIG. 4a shows an object model representing resources in the environment and FIG. 4b shows the resulting undirected graph representations G[V, E, δ].
Figure 4B:
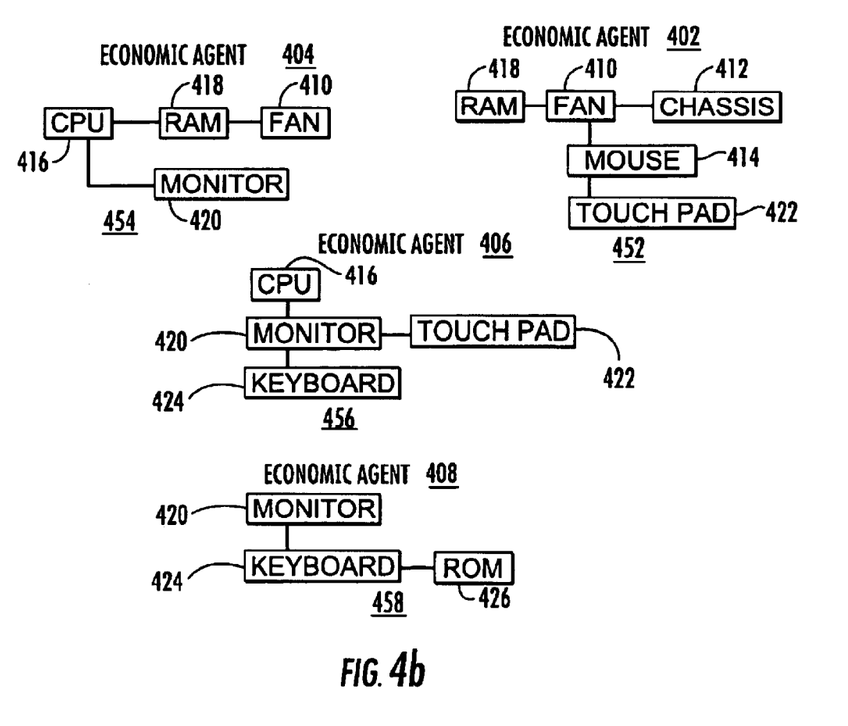

To illustrate the results of the SearchComplement method 300 and the SearchSubstitute method 350, FIG. 4a shows an object model 400 representing resources in the environment and FIG. 4b shows the resulting undirected graph representations G[V, E, δ] 452, 454, 456, and 458. The assembly object 402 comprises the fan component object 410, the chassis component object 412 and the mouse component object 414. Similarly, the assembly object 404 comprises a CPU component object 416 and a RAM component object 418. The assembly object 406 comprises a monitor component object 420 and a touchpad component object 422. The assembly object 408 comprises a keyboard object 424 and a ROM object 426.

FIG. 4b shows the undirected graph representations G[V, E, δ] 452, 454, 456 and 458 at the resources 402, 404, 406, and 408 respectively resulting from execution of the SearchComplement method 200 and the SearchSubstitute method 350 for a period of time. For example, the undirected graph representation G[V, E, δ 452 at the resource 402 shows complement relations between the RAM object 418 and the fan object 410, the fan object 410 and the chassis object 412, and the fan object 410 and the mouse object 414. Similarly, the undirected graph representation G(V, E, δ] 452 at the resource 402 shows a substitute relation between the mouse object 414 and the touchpad object 422. Next, the undirected graph representation G[V, E, δ] 454 at the resource 404 shows complement relations between the RAM object 418 and the fan object 410, the RAM object 418 and the CPU object 416, and the CPU object 416 and the monitor object 420.

Accordingly, each device 110 representing a resource maintains a partial subgraph of the undirected graph representation G[V, E, δ]. As is known in the art, an undirected graph G[V', E', δ'] is called a subgraph of an undirected graph G[V, E, δ] if V' is a subset of v and if E' (a subset of E) consists of all the edges in E joining vertices in V'. Further, δ' is a restriction of δ to the domain E'. G' is a partial subgraph of G if E' is a subset of all edges joining vertices in V'. See *Introduction to Discrete Structures*, Chapter 2.

Figure 5:
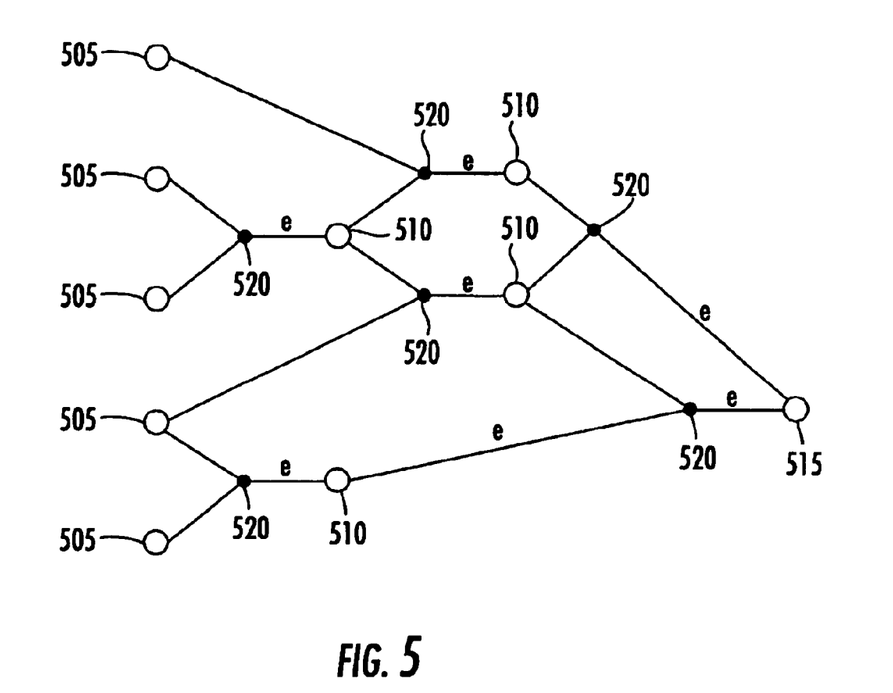
FIG. 5 shows another exemplary undirected graph G[V, E, δ] representation of the relations among resources in an environment called a technology graph.

FIG. 5 shows an exemplary undirected graph G[V, E, δ] representation of the relations among resources in an environment called a technology graph. A technology graph is a model of a firm's processes. More specifically, a technology graph is a multigraph representation of a firm's processes. In the technology graph (V,E) of a firm's processes, each vertex v of the set of vertices V represents an object. More formally, there exists a one-to-one correspondence between the set of objects representing the resources and the set of vertices V in the technology graph (V,E) of the firm's processes. A function denoted by g: O−>V from the set of objects O representing the resources to the set of vertices V in the corresponding multigraph (V,E) assigns the vertex v to an object o (g(o)=v).

In the technology graph (V,E) of a firm's processes, each hyperedge e of the set of hyperedges E represents a transformation as shown by FIG. S. The outputs of the hyperedge e are defined as the intermediate resources 510 or the finished resources 515 produced by execution of the transformation represented by the hyperedge e. The outputs of the hyperedge e also include the waste products of the transformation. The inputs of the hyperedge e represent the complementary objects used in the production of the outputs of the hyperedge.

Resources 505, including intermediate resources 510 and finished resources 515, and machines 520 are types of parts and/or operations in the environment. Machines 520 are parts and/or operations that perform ordered sequences of transformations on an input bundle of resources to produce an output bundle of resources. Accordingly, intermediate resources 510 are produced when machines 520 execute their transformations on an input bundle of resources. A machine 520 which mediates transformations is represented in the technology graph H=(V, E) as an input to a hyperedge e. In an alternate embodiment, a machine 520 which mediates transformations is represented as an object which acts on the hyperedge e to execute the transformation. Finished resources 515 are the end products which are produced for the consumer.

The objects and transformations among the objects in the technology graph H=(V, E) constitute a generative grammar. As is known by persons of ordinary skill in the art, context-free grammars represent transformations or productions on symbol strings. Each production specifies a substitute symbol string for a given symbol string. The technology graph H=(V, E) extends the principles of context-free grammars from symbol strings and transformations among symbol strings to objects and transformations among objects. The expressiveness of the technology graph H=(V, E) is higher than that of context-free grammars as hypergraphs can represent multidimensional relationships directly. The technology graph H=(V, E) also expresses a context sensitive grammar.

Each transformation in the technology graph H=(V, E) may specify a substitute hypergraph for a given hypergraph. Accordingly if a subgraph within a hypergraph matches a given hypergraph in a transformation, the subgraph is removed and replace by the substitute hypergraph. The resulting hypergraph is derived from the original hypergraph.

Additional information on the representation of parts, operations and other resources and the synthesis of technology graphs appears in co-pending patent application Ser. No. 09/345,441, filed Jul. 1, 1999, titled "An Adaptive and Reliable System and Method for Operations Management", the contents of which are herein incorporated by reference.

Additional information on the synthesis of an economic web model describing the local structure of relations within the vicinity of a firm or other economic agent appears in co-pending U.S. patent application Ser. No. 09/080,040, titled, "The System and Method for the Synthesis of An Economic Web and the Identification of New Market Niches", filed on May 15, 1998, the contents of which are herein incorporated by reference.

Figure 6:
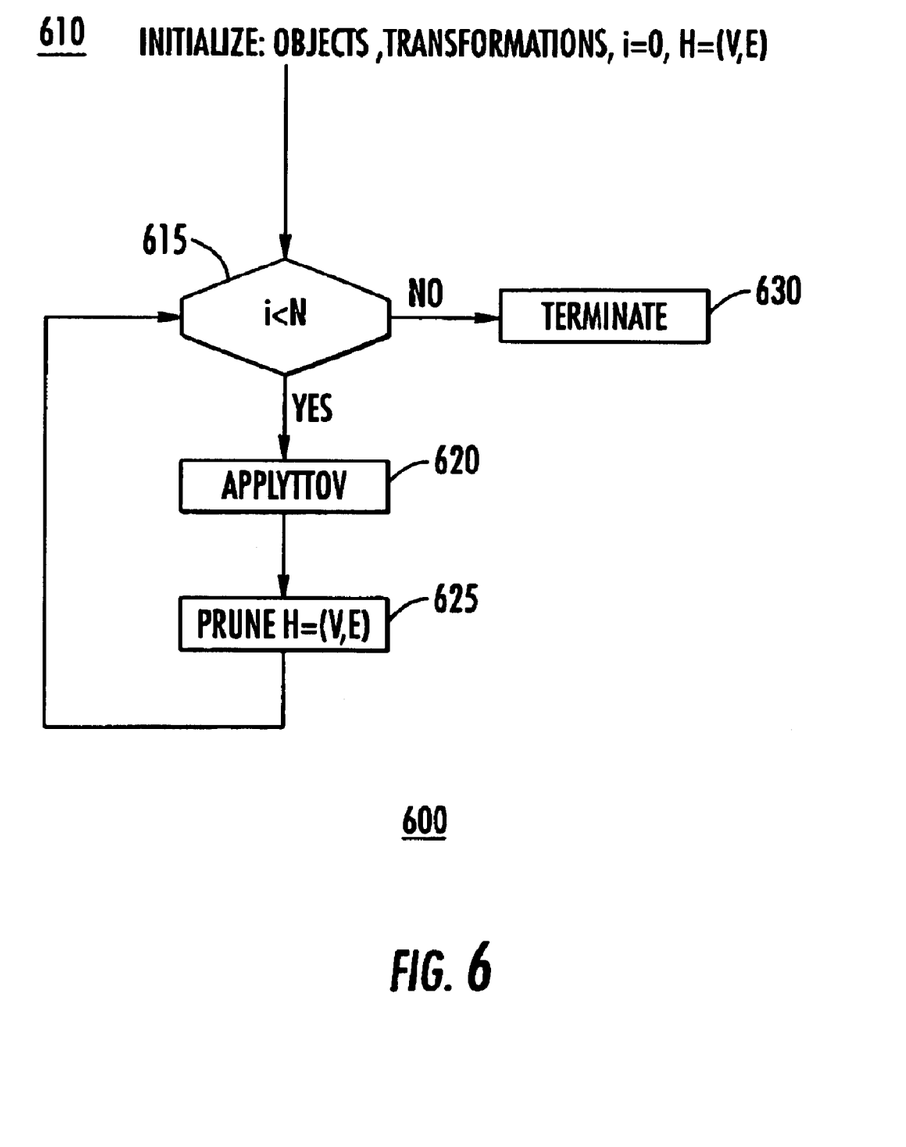
FIG. 6 provides a dataflow diagram illustrating a method for finding relations among resources and performing transformations on these related resources to create new resources.

FIG. 6 provides a dataflow diagram illustrating a method for finding relations among resources and performing transformations on these related resources 600 to create new resources. In step 610, the method 600 searches for relations among the resources in the environment. Without limitation, these relations include complement relations and substitute relations. In step 620, the method 600 evaluates the relations that were found in step 610. In step 630, the method 600 selects at least one optimal relation from the relations found in step 610 with respect to the evaluation that was performed in step 620. In step 640, the method 600 performs a transformation on the resources having the selected relation to create at least one new resource.

To illustrate the operation of the system of operations management of the present invention, consider an engine block resource and a piston resource. In the preferred embodiment, each of the resources is represented by a device 110. Each device 110 characterizes it corresponding resource with attributes and behavior such as "is a", "needs a", "has a", "does a", etc. For example, the engine block resource has a cylinder hole. The system of the present invention finds ways in which these two parts can fit together. Accordingly, the devices 110 representing these resources discover that inserting the piston into the cylinder hole of the engine creates a completed cylinder piston resource. Similarly, the present invention discovers that a saw operates on a plank of wood to cut it into two pieces.

More generally, characterization of the resources, the rules that define how the resources fit together and the determination of relations among the resources of the present invention constitute a generative grammar for the entire technology graph 500 of resources that can be constructed from a founder set of resources.

In the preferred embodiment, each device 110 contains a generative grammar concerning its corresponding resource, all of the resources from the founder set that was used to create the corresponding resource, its attributes and behavior and the relation among these resources.

The paths in the technology graph H=(V, E) which begin at vertices corresponding to objects in the founder set and end at vertices corresponding to finished goods represent the processes for producing the finished goods from the objects in the founder set. A path $P_i$ of a hypergraph H=(V, E) is defined as an alternating sequence of vertices and edges $v_{i1}$, $e_{i1}$, $v_{i2}$, $e_{i3}$, $V_{i3}$, $e_{i3}$, $v_{i4}$, $e_{i4}$ . . . such that every pair of consecutive vertices in $P_i$ are connected by the hyperedge e appearing between them along $P_i$. As previously discussed, the vertices of the technology graph represent renewable resources, intermediate objects and finished objects and the hyperedges of the technology graph represent transformations. Accordingly, a path $P_i$ in the technology graph H=(V, E) from a founder set to a finished good identifies the renewable resources, the intermediate objects, the finished objects, the transformations and the machines mediating the transformations of the process. Thus, a process is also referred to as a construction pathway.

The technology graph H=(V, E) also contains information defining a first robust constructability measure of a terminal object representing a finished good or service. The first robust constructability measure for a terminal object is defined as the number of processes or construction pathways ending at the terminal object. Process redundancy for a terminal object exists when the number of processes or construction pathways in a technology graph exceeds one. Failures such as an interruption in the supply of a renewable resource or the failure of a machine cause blocks along construction pathways. Greater numbers of processes or construction pathways to a terminal object indicate a greater probability that a failure causing blocks can be overcome by following an alternate construction pathway to avoid the blocks. Accordingly, higher values of the first robust constructability measure for a terminal object indicate higher levels of reliability for the processes which produce the finished good or service represented by the terminal object. Further, the technology graph extends the traditional notion of the makespan.

The technology graph H=(V, E) also contains information defining a second robust constructability measure of a terminal object representing a finished good or service. The second robust constructability measure for a terminal object is defined as the rate at which the number of processes or construction pathways ending at the terminal object increases with the makespan of the process. For example, suppose a terminal object can be constructed with a makespan of N time steps with no process redundancy. Since there is no process redundancy, a block along the only construction pathway will prevent production of the terminal object until the cause of the block is corrected. The relaxation of the required makespan to N+M time steps will increase the number of construction pathways ending at the terminal object. Accordingly, failures causing blocks can be overcome by following an alternate construction pathway to the terminal object. In other words, while the minimum possible makespan increased by M time steps, the resulting greater numbers of processes or construction pathways to the terminal object led to greater reliability. Thus, the present invention extends the notion of a makespan to include the concept of robust constructability.

The technology graph H=(V, E) contains additional robust constructability measures of a class or family of terminal objects representing different finished goods or services. As previously discussed, objects having common attributes and behavior are grouped into a class. See *Object Oriented Modeling and Design*, Chapter 1. In the technology graph H=(V, E), each class represents a set of objects having common attributes and behavior. Exemplary attributes and behavior which are used to group terminal objects into classes include, without limitation, structural and functional features. Structural and functional features include attributes and behavior such as "needs a", "is a", "performs a", "has a", etc.

The additional robust constructability measures involve vertices which exist within the construction pathways of two or more terminal objects. These objects represented by these vertices are called poly-functional intermediate objects because two or more terminal objects can be constructed from them. For example, consider two terminal objects representing a house and a house with a chimney. The poly-functional intermediate objects are the objects represented by vertices which exists within a construction pathway of the house and within a construction pathway of the house with the chimney. Thus, if a consumer requests a chimney in a house after a firm has constructed the house without a chimney, the firm can add the chimney to the house by backtracking along the construction pathway of the house to a poly-functional intermediate object and proceeding from the poly-functional intermediate object along a construction pathway of the house ith a chimney.

Figure 7:
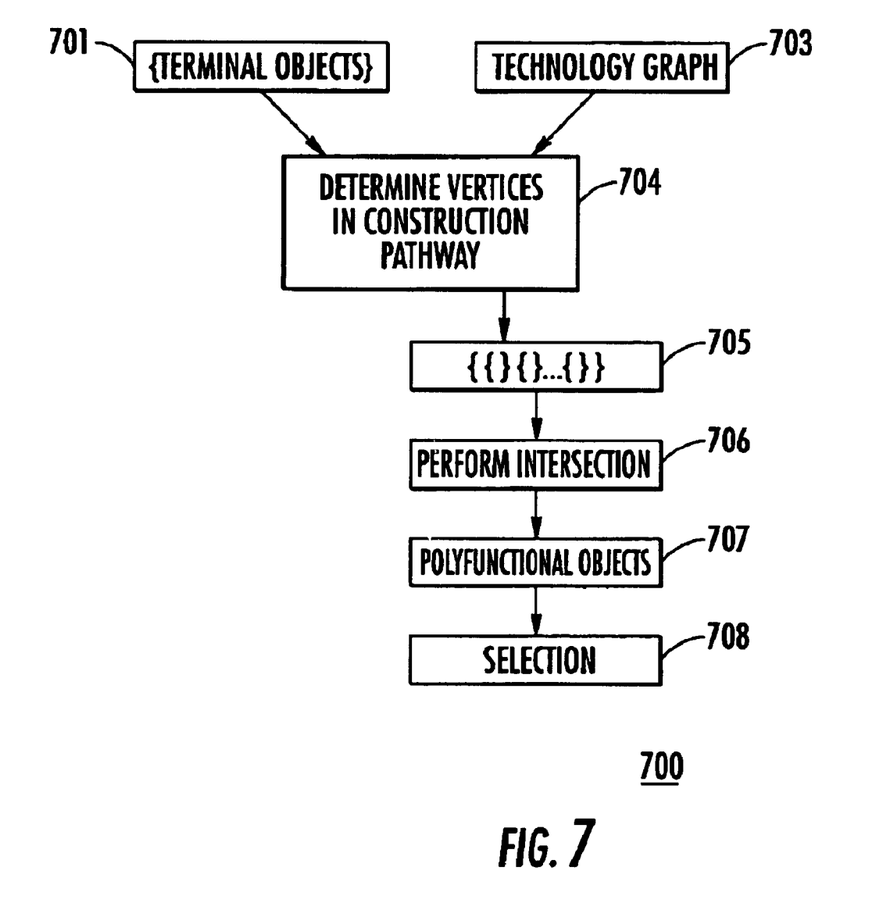
FIG. 7 provides a flow diagram 700 for locating and selecting poly-functional intermediate objects for a set of terminal objects having a cardinality greater than or equal to two.

FIG. 7 provides a flow diagram 700 for locating and electing poly-functional intermediate objects for a set of terminal objects 701 having a cardinality greater than or equal to two. In step 704, the method determines the vertices which exist within the construction pathways of each terminal object in the set of terminal objects 701 in the technology graph H=(V, E). Execution of step 704 yields a set of vertices 705 for each terminal object in the set of terminal objects 701. Accordingly, the number of sets of vertices 705 resulting from execution of step 704 is equal to the cardinality of the set of terminal objects 701. In step 706, the method performs the intersection operation on the sets of vertices 705. Execution of step 706 yields the vertices which exist within the construction pathways of every terminal object in the set of terminal objects 701. In other words, execution of step 706 yields the poly-functional intermediate objects 707 of the set of terminal objects 701.

In step 708, the method performs a selection operation on the poly-functional intermediate objects 707. Preferably, step 708 selects the poly-functional intermediate object 707 with the smallest fractional construction pathway distance. The fractional construction pathway distance of a given poly-functional intermediate object is defined as the ratio of two numbers. The numerator of the ratio is the sum of the smallest distances from the given poly-functional intermediate object to each terminal object in the set of terminal objects 701. The denominator of the ratio is the sum of the numerator and the sum of the smallest distances from each object in the founder set to the given poly-functional intermediate object. The distance between two vertices along a construction pathway in the technology graph H=(V, E) is defined as the number of hyperedges e on the construction pathway between the two vertices. The smallest distance between two vertices in the technology graph H=(V, E) is the number of hyperedges e on the shortest construction pathway.

Alternatively, step 708 considers the process redundancy in addition to the fractional construction pathway distance in the selection of the poly-functional intermediate objects 707. This alternative selection technique first locates the poly-functional intermediate object 707 having the smallest fractional construction pathway distance. Next, the alternative technique traverses the construction pathways from the poly-functional intermediate object 707 having the smallest fractional construction pathway distance toward the founder set until it reaches a poly-functional intermediate object 707 having a sufficiently high value of process redundancy. A sufficiently high value of process redundancy can be predetermined by the firm.

The method of FIG. 7 for locating and selecting poly-functional intermediate objects for a set of terminal objects 501 can also be executed on different subsets of the power set of the set of terminal objects 701 to locate and select poly-functional intermediate objects for different subsets of the set of terminal objects.

As indicated by the preceding discussion, the present invention identifies and selects the poly-functional object which leads to process redundancy to achieve reliability and adaptability. Specifically, a firm should ensure that there is an adequate inventory of the selected poly-functional object to enable the firm to adapt to failures and changes in the economic environment.

The present invention further includes various collective distributed optimization processes that use the knowledge of the relations among the resources in the technology graph to optimize the overall operation of a firm (such as a manufacturing plant) operating in an environment of resources.

Having all devices 110 attempt to select optimal relations as indicated in step 630 of FIG. 6 will not always result in the discovery of the globally optimum solution as explained in "At Home in the Universe" by Stuart Kauffman, Oxford University Press, Chapter 11 in the context of an NK fitness landscape, the contents of which are herein incorporated by reference. This result occurs because actions taken by one device 110 effect its state and possibly changes the context of the evaluation for its neighboring devices 110.

Accordingly, in the preferred embodiment the present invention utilizes combinations of the following three semi-local strategies:

patches In this technique, devices 110 representing resources are partitioned into subsets called patches. In one embodiment, the patches are disjoint subsets. The patches may or may not be topologically contiguous. Within a patch, the actions of devices 110 are coordinated to maximize the aggregate utility for the entire patch. The size and location of patches are parameters for this strategy. The size and location of patches range from the situation where each resource is a separate patch to the situation where all the resources in the system represent a single patch.

p A neighborhood is defined for a node such that when a decision is made there, the utility at the current device 110 and at a proportion p of neighboring devices 110 are taken into account. A neighborhood need not consist of the immediate topological neighbors of the device 110. Using the p algorithm, each resource measures the consequences of a change (such as undergoing a transformation with a related resource as in FIG. 6, step 640) on a proportion p of its neighboring resources. Preferably, the proportion p of neighboring resources is randomly chosen. Preferably, the value of p is less than one.

tau Only a fraction (called tau) of the devices 110 make decisions that affect the utility of other devices 110 at the same time. As the fraction of resources that change in the same short time interval increase, total performance typically increases initially and then, decreases.

Figure 8:
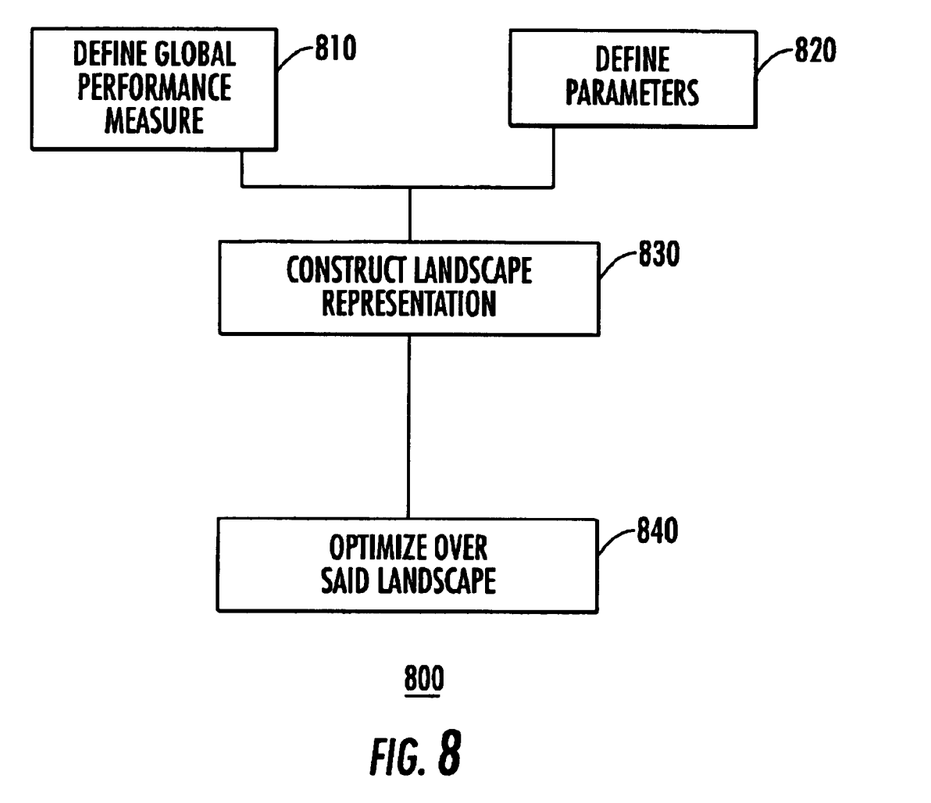
FIG. 8 provides a flow diagram 800 for determining optimal valus of parameters for systems performing operations management.

FIG. 8 provides a flow diagram 800 for determining optimal values of parameters of systems for operations management. In step 810, the present invention defines a global performance measure for the system. In step 820, the present invention defines a set of parameters. Exemplary parameters include the size and location of patches, the neighborhood, p where the utility is considered in making a decision and the fraction, tau, of the devices 110 that change to affect the utility of other devices 110, In step 830, the method 800 constructs a landscape representation for values of the parameters and their associated global performance measure. In step 840, the method optimizes over the landscape to produce optimal values for the parameters.

In one embodiment, the present invention uses either patches or p or both to define a modified utility for a device 110 in the system for operations management of the present invention. Optionally, the present invention uses the tau strategy either alone, or in conjunction with p and "patches" to limit the opportunities that devices 110 have for making decisions that affect the utility of other devices 110. For example, the utility of a device 110 is the aggregate utility for a region of devices 110 (a patch). Only a fraction tau of the resources represented by a device 110 can combine with other resources (as shown in FIG. 6, step 640) at one time. Preferably, the parameters for these strategies (the fraction p, the fraction tau and the number and membership of patches) are global in nature. In other words, the values of these parameters are the same for all devices 110. Alternatively, the values of the parameters may vary among the devices 110.

Preferably, the present invention sets these parameters as follows:

First, a global performance measure for the system of operations management is defined. Second, the algorithm has an outer loop that varies the parameters in order to maximize the global performance measure in accordance with techniques for searching landscapes as described in the co-pending international patent application titled, "A System and Method for the Analysis and Prediction of Economic Markets", filed Dec. 22, 1999 at the U.S. receiving office, the contents of which are herein incorporated by reference.

Preferably, each value of the global parameters governing p, patches, tau, and reinforcement learning features, defines a point in the global parameter space. With respect to this point, the operations management system of the present invention achieves a given global fitness. The distribution of global fitness values over the global parameter space constitutes a "fitness landscape" for the entire operations management system. Such landscapes typically have many peaks of high fitness, and statistical features such as correlation lengths and other features as described in co-pending international patent application number PCT/US99/19916, titled, "A Method for Optimal Search on a Technology Landscape", the contents of which are herein incorporated by reference. In the preferred embodiment, these features are used to optimize an evolutionary search in the global parameter space to achieve values of p, patches, tau, and the internal parameters of the reinforcement learning algorithm that optimize the learning performance of the operations management system in a stationary environment. Preferably, the same search procedures are also used to persistently tune the global parameters of the operations management system in a non-stationary environment.

By tuning of the global parameters to optimize learning, the present invention is "self calibrating". In other words, the invention includes an outer loop in its learning procedure to optimize learning itself, where co-evolutionary learning is in turn controlled by combinations of p, patches, and tau, plus features of the reinforcement learning algorithm. The inclusion of features of fitness landscapes aids optimal search in this outer loop for global parameter values that themselves optimize learning by the operations management system 100 in stationary and non-stationary environments.

Use of p, tau, or patches aids adaptive search on rugged landscapes because each by itself causes the evolving system to ignore some of the constraints some of the time. Judicious balancing of ignoring some of the constraints some of the time with search over the landscape optimizes the balance between "exploitation" and "exploration". In particular, without the capacity to ignore some of the constraints some of the time, adaptive systems tend to become trapped on local, very sub-optimal peaks. The capacity to ignore some of the constraints some of the time allows the total adapting system to escape badly sub-optimal peaks on the fitness landscape and, thereby, enables further searching. In the preferred embodiment, the present invention tunes p, tau, or patches either alone or in conjunction with one another to find the proper balance between stubborn exploitation hill climbing and wider exploration searching.

The optimal character of either tau alone or patches alone is such that the total adaptive system is poised slightly in the ordered regime, near a phase transition between order and chaos. See, e.g., "At Home in the Universe" by Stuart Kauffman, Chapters 1, 4, 5, and 11, the contents of which are herein incorporated by reference, and "The Origins of Order" by Stuart Kauffman, Oxford University Press, 1993, Chapters 5 and 6, the contents of which are herein incorporated by reference.

Without limitation, the embodiments of the present invention have been described in the illustrative context of a solution using tau, p, and patches. However, it will be apparent to persons of ordinary skill in the art that other techniques that ignore some of the constraints some of the time could be used to embody the aspect of the present invention which includes defining an algorithm having one or more parameters, defining a global performance measure, constructing a landscape representation for values of the parameters and their associated global performance value, and optimizing over the landscape to determine optimal values for the parameters. Other exemplary techniques that ignore some of the constraints some of the time include simulated annealing, or optimization at a fixed temperature. In general, the present invention employs the union of any of these means to ignore some of the constraints some of the time together with reinforcement learning to achieve good problem optimization.

Without limitation, the embodiments of the present invention have been described in the illustrative context of a system for operations management where the computational power to characterize resources and determine relations among the resources resides in the devices 110 that corresponding to the resources. However, it is apparent to persons of ordinary skill in the art that alternative operations management systems could be used to embody the aspect of the present invention which includes characterizing resources, determining relations among the resources and transforming selected resources to form new resources. For example, in an alternate embodiment, a separate computer characterizes the resources, determines relations among the resources and transforms selected resources into new resources.

While the above invention has been described with reference to certain preferred embodiments, the scope of the present invention is not limited to these embodiments. One skill in the art may find variations of these preferred embodiments which, nevertheless, fall within the spirit of the present invention, whose scope is defined by the claims set forth below.

What is claimed is:

1. A system for performing operations management in an environment of a plurality of resources comprising:

a plurality of devices corresponding to the plurality of resources, each of said devices performing the steps of:
characterizing said corresponding resource; and
determining at least one relation between said corresponding resource and others of said plurality of resources, wherein said step of determining at least one relation comprises the step of searching for at least one of complementary ones and substitute ones of said resources.

2. A system for performing operations management as in claim 1 wherein said each device performs the further steps of:

selecting at east one of said resources having said at least one relation; and
transforming said selected resources to form at least one new resource in the environment.

3. A system for performing operations management as in claim 2 wherein said characterizing said corresponding resource step comprises the step of representing characteristics with a plurality of properties and/or processes.

4. A system for performing operations management as in claim 3 wherein said selecting at least one of said resources step comprises the steps of:

identifying matching ones of said properties and/or processes to form a plurality of matching groups;
evaluating said matching groups by computing how well said attributes match; and
selecting at least one of said matching groups that are optimal with respect to said evaluation.

5. A system for performing operations management as in claim 3 wherein said properties are selected from the group consisting of isa, hasa, doesa, and needsa.

6. A system for performing operations management as in claim 2 wherein said devices perform the further step of:

determining a graph representation of said resources and said relations.

7. A system for performing operations management as in claim 1 wherein said determining at least one relation step comprises the step of:

searching for resources having complementary ones of said properties and/or processes.

8. A system for performing operations management as in claim 1 wherein said determining at least one relation step comprises the step of:

searching for resources having substitute ones of said properties and/or processes.

9. A system for performing operations management as in claim 1 wherein each of said plurality of devices is physically attached to said corresponding resource.

10. A system for performing operations management as in claim 1 wherein each of said devices comprise data to identify said corresponding resource.

11. A system for performing operations management as in claim 10 wherein said data is a bar code.

12. A system for performing operations management in an environment of a plurality of resources comprising:

a plurality of devices corresponding to the resources, each of said devices performing the step of:
characterizing said corresponding resources; and
selectively transforming said corresponding resource.

13. A system for performing operations management as in claim 12 wherein said selectively transforming said corresponding resource comprises the steps of:

determining a plurality of candidate transformations of said corresponding resource; and
evaluating at least one expected consequence of performing said at least one candidate transformation on a subset, P, of the plurality of resources.

14. A system for performing operations management as in claim 13 wherein said selectively transforming step further comprises the step of:

performing said selected candidate transformation.

15. A system for performing operations management as in claim 13 wherein said subset, P, of the plurality of resources is a proper subset.

16. A system for performing operations management as in claim 12 wherein said selectively transforming step is performed by only a portion, tau, of said devices.

17. A system for performing operations management as in claim 12 wherein said selectively transforming said corresponding resource step comprises the step of:

determining a plurality of candidate transformations of said corresponding resource;
assigning said corresponding resource to at least one patch of said resources;
evaluating a utility of said patch of resources of performing said candidate transformations; and
selecting at least one of said candidate transformations that is optimal with respect to said utility.

18. A system for performing operations management as in claim 17 wherein said patch is a proper subset of the plurality of resources.

19. A system for performing operations management as in claim 17 wherein said at least one patch is at least one disjoint subset of the plurality of resources.

20. A system for performing operations management in an environment of entities and resources comprising:

a plurality of devices corresponding to the plurality of resources, each of said devices performing the steps of:

representing said corresponding resource with data; and transmitting said data of said corresponding resource to others of said plurality of devices; and at least one computer, said computer performing the steps of:

receiving said data representing said corresponding resource for at least one of said devices; and determining at least one relation among the resources for said data representing said corresponding resource.

21. A system for performing operations management as in claim 20 further comprising a communication network communicating said data among said at least one computer and said at least one integrated circuit.

22. A method for performing operations management in an environment of a plurality of resources comprising the steps of:

defining at least one algorithm having one or more parameters for performing operations management;

defining at least one global performance measure of said at least one algorithm;

executing said algorithm for a plurality of different values of said one or more parameters to generate a corresponding plurality of values for said global performance measure;

constructing a fitness landscape from said values of said parameters and said corresponding values of said global performance measure; and optimizing over said fitness landscape to generate optimal values for said at least one parameter.

23. A method for performing operations management as in claim 22 wherein said defining an algorithm step comprises the steps of:

representing the plurality of resources with a corresponding plurality of devices wherein each of said devices performs the steps of:

characterizing said corresponding resource; and selectively transforming said corresponding resource.

24. A method for performing operations management as in claim 23 wherein said at least one parameter comprises a proportion, p of the plurality of resources.

25. A method for performing operations management as in claim 24 wherein said selectively transforming said corresponding resource step comprises the steps of:

determining a plurality of candidate transformation of said corresponding resource; and evaluating at least one expected consequence of performing said at least one candidate transformation on said proportion, p of the plurality of resources.

26. A method for performing operations management as in claim 25 wherein said selectively transforming step further comprises the step of:

performing said selected candidate transformation.

27. A method for performing operations management as in claim 23 wherein said at least one parameter comprises a fraction, tau, of said plurality of devices.

28. A method for performing operations management as in claim 27 wherein said selectively transforming step is performed on only said fraction, tau, of said plurality of devices.

29. A method for performing operations management as in claim 23 wherein said at least one parameter comprises a size of one or more patches of said plurality of devices and a location of said patches.

30. A method for performing operations management as in claim 29 wherein said selectively transforming said corresponding resource step comprises the step of:

determining a plurality of candidate transformations of said corresponding resource;

assigning said corresponding resource to at least one of said patches of said resources;

evaluating a utility of said patch of resources of performing said candidate transformations; and selecting at least one of said candidate transformations that is optimal with respect to said utility.

31. A device for performing operations management in an environment of a plurality of resources, said device representing one of the resources and comprising at least one memory storing computer executable program codes, wherein the program code comprises:

code to characterize said corresponding resource; and code to determine at least one relation between said corresponding resource and others of said plurality of resources, wherein said code to determine at least one relation comprises code to search for at least one of complementary ones and substitute ones of said resources.

32. The device of claim 31, wherein the program code further comprises:

code to select at least one of said resources having said at least one relation; and code to transform said selected resources to form at least one new resource in the environment.

33. A system for performing operations management in an environment of a plurality of resources comprising:

a plurality of devices corresponding to the plurality of resources, each of said devices performing the steps of:

characterizing said corresponding resource, and determining at least one relation between said corresponding resource and others of said plurality of resources, wherein each of said plurality of devices is physically attached to said corresponding resource.

34. A system for performing operations management in an environment of a plurality of resources comprising:

a plurality of devices corresponding to the resources, each of said devices performing the step of:

characterizing said corresponding resources; and selectively transforming said corresponding resource, wherein said step of selectively transforming is performed by only a portion, tau, of said devices.

* * * * *